(12) United States Patent
Chang et al.

(10) Patent No.: US 12,347,827 B2
(45) Date of Patent: *Jul. 1, 2025

(54) BILAYER COMPONENT FOR A LITHIUM BATTERY

(71) Applicants: Samsung Electronics Co., Ltd., Suwon-si (KR); Massachusetts Institute of Technology, Cambridge, MA (US)

(72) Inventors: Won Seok Chang, Mountain View, CA (US); Zachary Hood, Cambridge, MA (US); Jennifer Rupp, Cambridge, MA (US); Lincoln Miara, Lincoln, MA (US)

(73) Assignees: SAMSUNG ELECTRONICS CO., LTD., Gyeonggi-Do (KR); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,206

(22) Filed: May 23, 2023

(65) Prior Publication Data

US 2023/0299340 A1    Sep. 21, 2023

Related U.S. Application Data

(63) Continuation of application No. 17/114,652, filed on Dec. 8, 2020, now Pat. No. 11,699,811.

(Continued)

(51) Int. Cl.
*H01M 10/0562* (2010.01)
*C01B 21/082* (2006.01)
(Continued)

(52) U.S. Cl.
CPC ..... *H01M 10/0562* (2013.01); *C01B 21/0821* (2013.01); *C01G 25/006* (2013.01);
(Continued)

(58) Field of Classification Search
CPC .. H01M 10/0562; H01M 4/382; H01M 4/405; H01M 10/052; H01M 2004/027;
(Continued)

(56) References Cited

U.S. PATENT DOCUMENTS

2015/0044575 A1    2/2015  Kawaji et al.
2015/0180001 A1    6/2015  Johnson et al.
(Continued)

FOREIGN PATENT DOCUMENTS

WO    2020081718 A1    4/2020

OTHER PUBLICATIONS

Shen, Xin et al., "Beyond lithium ion batteries: Higher energy density battery systems based on lithium metal anodes", Energy Storage Materials 12 (2018); pp. 161-175.

*Primary Examiner* — Daniel S Gatewood
(74) *Attorney, Agent, or Firm* — CANTOR COLBURN LLP

(57) ABSTRACT

A component for a lithium battery including a first layer including a lithium garnet having a porosity of 0 percent to less than 25 percent, based on a total volume of the first layer; and a second layer on the first layer and having a porosity of 25 percent to 80 percent, based on a total volume of the second layer, wherein the second layer is on the first layer and the second layer has a composition that is different from a composition of the first layer.

9 Claims, 13 Drawing Sheets

Related U.S. Application Data

(60) Provisional application No. 62/994,466, filed on Mar. 25, 2020.

(51) Int. Cl.
    *C01G 25/00*     (2006.01)
    *H01M 4/02*     (2006.01)
    *H01M 4/38*     (2006.01)
    *H01M 4/40*     (2006.01)
    *H01M 10/052*     (2010.01)

(52) U.S. Cl.
CPC ........... *H01M 4/382* (2013.01); *H01M 4/405* (2013.01); *H01M 10/052* (2013.01); *C01P 2002/30* (2013.01); *C01P 2002/52* (2013.01); *C01P 2002/72* (2013.01); *C01P 2002/82* (2013.01); *C01P 2004/03* (2013.01); *C01P 2006/16* (2013.01); *C01P 2006/40* (2013.01); *H01M 2004/027* (2013.01); *H01M 2300/0071* (2013.01); *H01M 2300/0094* (2013.01)

(58) Field of Classification Search
CPC . H01M 2300/0071; H01M 2300/0094; H01M 10/0585; H01M 50/431; H01M 2300/0077; H01M 10/056; H01M 2300/0045; H01M 2300/0091; C01B 21/0821; C01G 25/006; C01P 2002/30; C01P 2002/52; C01P 2002/72; C01P 2002/82; C01P 2004/03; C01P 2006/16; C01P 2006/40; C01P 2002/54; C01P 2002/85; Y02E 60/10; Y02P 70/50; C04B 35/48; C04B 2235/3203; C04B 2235/3227; C04B 2235/3284; C04B 2235/764

See application file for complete search history.

(56) References Cited

U.S. PATENT DOCUMENTS

| | | |
|---|---|---|
| 2016/0308243 A1 | 10/2016 | Herle et al. |
| 2017/0155169 A1* | 6/2017 | Hitz .................... H01M 10/052 |
| 2018/0301752 A1 | 10/2018 | Sakamoto et al. |
| 2019/0027788 A1 | 1/2019 | Liu et al. |
| 2019/0044186 A1 | 2/2019 | Kim et al. |
| 2019/0051934 A1 | 2/2019 | Kim et al. |
| 2019/0051936 A1 | 2/2019 | Meshcheryakov et al. |
| 2019/0123384 A1 | 4/2019 | Harry et al. |
| 2019/0207252 A1* | 7/2019 | Badding ............... H01M 4/505 |
| 2020/0044281 A1 | 2/2020 | Zhu et al. |
| 2020/0044282 A1 | 2/2020 | Zhu et al. |
| 2020/0067128 A1 | 2/2020 | Chmiola et al. |
| 2022/0013806 A1 | 1/2022 | Chang et al. |

\* cited by examiner

BILAYER COMPONENT FOR A LITHIUM BATTERY

CROSS-REFERENCE TO RELATED APPLICATION

This application is a continuation of U.S. patent application Ser. No. 17/114,652 filed on Dec. 8, 2020, which claims priority to U.S. Provisional Patent Application No. 62/994,466, filed on Mar. 25, 2020, in the United States Patent and Trademark Office, and all the benefits accruing therefrom under 35 U.S.C. § 119, the content of all are incorporated herein in their entirety by reference.

BACKGROUND

1. Field

Disclosed is a bilayer component for a lithium battery, a method of manufacturing the same, and a lithium battery including the bilayer component.

2. Description of the Related Art

Lithium batteries are of interest because they can potentially offer improved specific energy and energy density. Also, to provide improved safety, solid-state materials are of particular interest. However, use of solid-state materials poses a number of engineering challenges, such as diffusion of elements between the positive electrode and a solid-state electrolyte, and volume changes that effect the mechanical integrity of the solid electrolyte-positive electrode interface. Thus, there remains a need for improved electrode and a solid-state electrolyte materials, and methods of manufacture thereof.

SUMMARY

Disclosed is a component for a lithium battery including a lithium-ion conducting material having improved stability and improved ionic conductivity, a method of manufacturing the same, and a lithium battery including the component.

In an embodiment, a component for a lithium battery includes: a first layer including a lithium garnet having a porosity of 0 percent to less than 25 percent, based on a total volume of the first layer; a second layer having a porosity of 25 percent to 80 percent, based on a total volume of the second layer, wherein the second layer is on the first layer and the second layer has a composition that is different from a composition of the first layer.

In an embodiment, disclosed is a method of manufacturing a component for a lithium battery, the method including: providing a substrate having a porosity of 25 percent to 80 percent, based on a total volume of the substrate; heating the substrate; contacting the heated substrate with a mixture including a lithium precursor, a lanthanum precursor, an aluminum precursor, a zirconium precursor, and a solvent to form a lithium garnet on the substrate to manufacture the component, wherein the component includes a first layer and a second layer, wherein the first layer includes the lithium garnet and has a porosity of 0 percent to less than 25 percent, based on a total volume of the first layer, and wherein the second layer includes the substrate.

In an embodiment, a lithium battery includes a positive electrode; a negative electrode including at least one of lithium or a lithium alloy; and the component between the positive electrode and the negative electrode, wherein the first layer of the component is proximate to the negative electrode and the second layer is proximate to the positive electrode, and wherein the second layer of the component comprises an ionic liquid within a pore thereof.

In an embodiment, a lithium battery includes a positive electrode; a negative electrode including at least one of lithium or a lithium alloy; and the component between the positive electrode and the negative electrode, wherein the first layer of the component is proximate to the positive electrode and the second layer is proximate to the negative electrode, and wherein the second layer of the component comprises an ionic liquid within a pore thereof.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
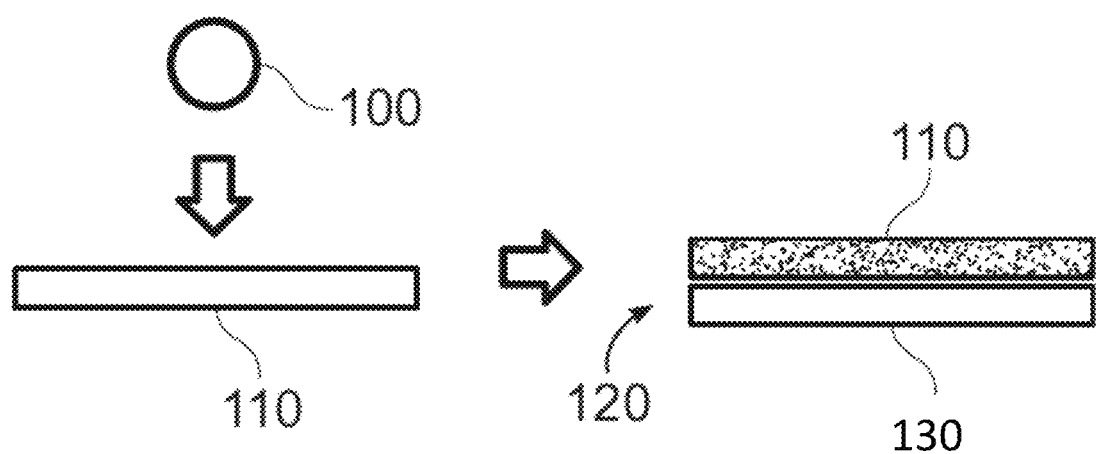
FIG. 1 is a schematic diagram of a method of manufacturing a component for a lithium battery.

Solid-state batteries are desired because they can potentially offer improved specific energy and energy density, while providing improved safety. Solid-state electrolyte materials may permit the use of a high-voltage nickel-manganese-cobalt (NMC) positive electrode active material, for example. High-voltage nickel-manganese-cobalt (NMC) is desirable because for its high capacity and promise for high volumetric energy density when used in a battery, in particular when combined with lithium metal, because of its high theoretical capacity and low electrochemical potential. However, interposing a solid-state electrolyte between a lithium negative electrode and an NMC positive electrode poses a number of engineering challenges. While not wanting to be bound by theory, it is understood that elemental inter-diffusion between the positive active material, e.g., NMC, and solid-state electrolyte, and volume changes when charged and discharged result in degradation of the mechanical integrity of the solid electrolyte-positive electrode interface.

To mitigate the above and other issues related to volume changes, an ionic liquid may be added between the solid-state electrolyte and the positive electrode to provide a hybrid lithium battery. However, currently available materials do not suitably prevent elemental inter-diffusion between the positive electrode and the solid-state electrolyte, which is understood to result in mechanical degradation of the solid electrolyte-positive electrode interface. Without wishing to be bound by theory, the disclosed technology is believed to protect the lithium metal negative electrode from reaction with the ionic liquid, and the ionic liquid allows for volume changes at the positive electrode, thereby providing improved mechanical integrity and stability of the interface between the solid-state electrolyte and the positive electrode, relative to when the ionic liquid is not used.

In a hybrid-battery, a bilayer component is provided. The bilayer comprises a dense layer, e.g., a nonporous layer, and a porous layer. It is a significant engineering challenge to form a bilayer with a dense layer that includes a continuous, e.g., pin-hole free, solid electrolyte that has a practical thickness, and is effectively impervious to an ionic liquid, and a layer on the dense layer. In an aspect, the dense, nonporous layer is adjacent the lithium metal and the porous layer is proximate the positive electrode. In another aspect the dense layer is proximate the positive electrode, and the porous layer is proximate the lithium metal. In an aspect, the porous layer is stable when contacted with a lithium metal negative electrode. In the disclosed component, the dense layer includes a continuous solid electrolyte with a thickness of 2 micrometers (μm) to 20 μm, that provides improved stability when contacted with an ionic liquid. Further, the disclosed component and method of manufacture address many of the engineering challenges associated with solid-state materials, to provide improved manufacturability.

In an embodiment, a component for a lithium battery includes a first layer comprising a lithium garnet having a porosity of 0 percent (%) to less than 25%, based on a total volume of the first layer; a second layer having a porosity of 25% to 80%, based on a total volume of the second layer, wherein the second layer is on the first layer and the second layer has a composition that is different from a composition of the first layer.

The first layer of the component may have a porosity of 0% (no pores) to less than 25%, based on a total volume of the first layer. The porosity of the first layer may be, for example, 0% to less than 25%, 1% to 20%, 5% to 15%, or 7% to 12%, based on a total volume of the first layer of the component.

The first layer comprises a lithium garnet. Garnet is a silicate that can be referred to using the formula $X_3Y_2(SiO_4)_3$, wherein X is a divalent cation, and Y is a trivalent cation. As used herein, the term "lithium garnet" means that the compound is isostructural with garnet, e.g., $Mg_3Al_2(SiO_4)_3$. In a lithium garnet, lithium is included as a cationic element.

In an embodiment, the component including the lithium garnet comprises at least one of a compound of Formula 1 or a compound of Formula 2:

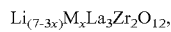, Formula 1

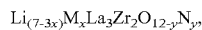, Formula 2 wherein, in Formulas 1 and 2,
each M is independently at least one of H, Hf, W, Te, Al, Ta, Ba, Ga, Sr, Mg, Nb, Fe, Mo, Cs, Ca or Nd, and x in Formula 1 and x in Formula 2 are each independently 0≤x≤5, and 0<y≤6.

In an embodiment, each M in Formulas 1 and 2 may independently be at least one of H, Hf, W, Te, Al, Ta, Ba, Ga, Sr, Mg, Nb, Fe, Mo, Cs, Ca or Nd. For example, each M may be H, Hf, Ca, or Al. Use of Al is mentioned.

In an embodiment, x in Formula 1 and x in Formula 2 are each independently 0 to 5, for example, 0.1 to 4.9, 0.5 to 4.5, 1 to 4, 1.5 to 3.5, or 2 to 4. In an embodiment, in Formula 2, y is 0 to 6, for example, 0.1 to 5.9, 0.5 to 5.5, 1 to 5, 1.5 to 4.5, or 2 to 5.

In an embodiment, the first layer of the component has a thickness of 0.1 micrometer (μm) to 40 μm. For example, the first layer of the component may have a thickness of 0.1 μm and 40 μm, 0.5 μm to 35 μm, 1 μm to 30 μm, 5 μm to 25 μm, or 10 μm and 20 μm.

The second layer of the component is on and may be directly on the first layer.

The second layer may comprise any suitable material, and may comprise at least one of an oxide, carbide, nitride, or a metal. A second layer comprising an aluminum oxide comprising iron, titanium, chromium, or copper, magnesium, MgO, $Al_2O_3$, $SiO_2$, indium tin oxide, zinc oxide, indium tin zinc oxide, SiC, Ti, Ni, or stainless steel is disclosed. Use of MgO is mentioned.

The second layer may comprise at least one of yttrium stabilized zirconia, aluminum oxide, anodized aluminum oxide, magnesium oxide, or a silicon oxide of the formula SiO, wherein 0≤x≤2.

In an embodiment, the second layer of the component has a thickness of 10 μm to 150 μm. For example, the second layer may have a thickness of 10 μm to 150 μm, 15 μm to 125 μm, 20 μm to 100 μm, or 30 μm to 75 μm.

When the second layer comprises an oxide, the second layer may have a Young's modulus of equal to or less than 150 megapascals (MPa). For example, the second layer may have a Young's modulus from 10 MPa to 150 MPa, 20 MPa to 140 MPa, 30 MPa to 130 MPa, or 40 MPa to 120 MPa.

In an embodiment, when the second layer comprises an oxide, the second layer may have a Young's modulus of equal to or greater than 150 MPa. For example, the second layer may have a Young's modulus from 150 MPa to 400 MPa, 160 MPa to 350 MPa, 170 MPa to 300 MPa, or 180 MPa to 250 MPa.

The second layer may have a porosity between 25% and 80% based on a total volume of the second layer. The porosity of the second layer may be, for example, 25% to 80%, 30% to 75%, 40% to 65%, or 50% to 60%, based on a total volume of the second layer of the component.

The second layer in the component is porous, and an average pore diameter in the second layer may be 1 nanometer (nm) to 50 nm. A pore diameter in the second layer may be, for example, 1 nm to 50 nm, 5 nm to 45 nm, 10 nm to 40 nm, 15 nm to 35 nm, or 20 nm to 30 nm.

The porosity of each layer of the component may be determined by scanning electron microscopy, the details of which can be determined by one of skill in the art without undue experimentation.

In an embodiment, the second layer may comprise at least one of a polymeric material or a fibrous material, wherein the second layer material may have a Young's modulus equal to or less than 100 MPa. The second layer material may have a Young's modulus of 10 MPa to 100 MPa, 20 MPa to 90 MPa, 30 MPa to 80 MPa, or 40 MPa to 70 MPa.

The component may comprise an ionic liquid. Any suitable ionic liquid may be used. An ionic liquid comprises a cation and an anion, and is a liquid at room temperature, e.g., 25° C.

The cation of the ionic liquid may comprise an imidazolium cation, an ammonium cation, a pyrrolidinium cation, or a piperidinium cation. Non-limiting examples of the cation include at least one of a C1 to C12 alkyl ammonium cation, such as triethyl ammonium, an imidazolium cation, such as ethyl methyl imidazolium or butyl methyl imidazolium, a pyrrolidium cation, such as 1-methyl-1-propylpyrrolidium, or a methyl propylpiperidium cation. The ionic liquid may comprise at least one of triethyl ammonium, ethyl methyl imidazolium, butyl methyl imidazolium, 1-methyl-1-propylpyrrolidium, methyl propylpiperidium, bis(trifluoromethylsulfonyl)imide, bis(pentafluoroethylsufonyl)imide, tetrafluoroborate, hexafluorophosphate, poly(l-vinyl-3-alkylimidazolium), a cation of poly(l-allyl-3-alkylimidazolium), or a cation of poly(1-(meth)acryloyloxy-3-alkylimidazolium).

The anion of the ionic liquid may comprise at least one of a bis(fluorosulfonyl)imide, bis(fluorosulfonyl)amide, fluoroborate, or a fluorophosphate. However, embodiments are not limited thereto. Non-limiting examples of the anion include at least one of bis(trifluoromethane)sulfonimide (TFSI), bis(pentafluoroethylsufonyl)imide (BETI), tetrafluoroborate ($BF_4^-$), or hexafluorophosphate ($PF_6^-$). In an embodiment, the ionic liquid may include, for example, [emim] $Cl/AlCl_3$ (wherein emim is ethyl methyl imidazolium), [bmpyr] $NTf_2$, (wherein bmpyr is butyl methyl pyridinium and NTf-trifluoromethanesulfonamide), [bpy] $Br/AlCl_3$ (wherein bpy is 4,4'-bipyridine), [choline] $Cl/CrCl_3 \cdot 6H_2O$, [emim] OTf/[hmim] (wherein emim is ethyl methyl imidazolium, hmim is hexyl methyl imidazolium, and OTf is trifluoromethanesulfonate), [choline] $Cl/HOCH_2CH_2OH$, [$EtMeN(CH_2CH_2OMe)$] $BF_4$ (wherein Et is ethyl, Me is methyl, Pr is propyl, Bu is butyl, Ph is phenyl, Oct is octyl, and Hex is hexyl), [$Bu_3PCH_2CH_2C_8F_{17}$]OTf (wherein OTf is trifluoromethanesulfonate), [bmim]$PF_6$ (wherein bmim is butyl methyl imidazolium), [bmim]$BF_4$ (wherein bmim is butyl methyl imidazolium), [omim]$PF_6$ (wherein omim is octyl methyl imidazolium), [$Oct_3PC_{18}H_{37}$]I (wherein Oct is octyl), [NC($CH_2$)mim] $NTf_2$ (wherein mim is methyl imidazolium and NTf is trifluoromethanesulfonamide), [$Pr_4N$] [$B(CN)_4$], [bmim] $NTf_2$ (wherein bmim is butyl methyl imidazolium and NTf is trifluoromethanesulfonamide), [bmim]$C_1$ (wherein bmim is butyl methyl imidazolium), [bmim][Me($OCH_2CH_2$)$_2OSO_3$] (wherein bmim is butyl methyl imidazolium and Me is methyl), [$PhCH_2$mim]OTf (wherein mim is methyl imidazolium, NTf is trifluoromethanesulfonamide, and OTf is trifluoromethane sulfonate), [$Me_3NCH(Me)CH(OH)Ph$] NTf, (wherein NTf is trifluoromethanesulfonamide, Me is methyl, and Ph is phenyl), [pmim][$(HO)_2PO_2$] (wherein pmim is propyl methyl imidazolium), [(6-Me)bquin]$NTf_2$ (wherein bquin is butyl quinolinium), [bmim][$Cu_2Cl_3$] (wherein bmim is butyl methyl imidazolium), [$C_{18}H_{37}OCH_2$mim]$BF_4$ (wherein mim is methyl imidazolium), [heim]$PF_6$ (wherein heim is hexyl ethyl imidazolium and NTf is trifluoromethanesulfonamide), [mim($CH_2CH_2O$)$_2$ $CH_2CH_2$mim][$NTf_2$]$_2$ (wherein mim is methyl imidazolium), [obim]$PF_6$ (wherein obim is octyl butyl imidazolium), [oquin]$NTf_2$ (wherein oquin is octyl quinolinium and NTf is trifluoromethanesulfonamide), [hmim][$PF_3(C_2F_5)_3$] (wherein hmim is hexyl methyl imidazolium), [$C_{14}H_{29}$mim]Br (wherein mim is methyl imidazolium), [$Me_2N(C_{12}H_{25})_2$]$NO_3$, [emim] $BF_4$ (wherein emim is ethyl methyl imidazolium), [$MeN(CH_2CH_2OH)_3$], [$MeOSO_3$], [$Hex_3PC_{14}H_{29}$]$NTf_2$ (wherein NTf is trifluoromethanesulfonamide), [emim][$EtOSO_3$] (wherein emim is ethyl methyl imidazolium and Et is ethyl), [choline][ibuprofenate], [emim]$NTf_2$ (wherein emim is ethyl methyl imidazolium and Ntf is trifluoromethanesulfonamide), [emim][$(EtO)_2PO_2$] (wherein emim is ethyl methyl imidazolium and Et is ethyl), [emim] $Cl/CrCl_2$ (wherein emim is ethyl methyl imidazolium), or [$Hex_3PC_{14}H_{29}$]$N(CN)_2$ (wherein Hex is hexyl). However, embodiments are not limited thereto. Any suitable anion may be used in the ionic liquid.

In an embodiment, the ionic liquid may be a polymeric ionic liquid. The polymeric ionic liquid may comprise an organic cation including an imidazolium group. The cation of the polymer ionic liquid may include at least one of poly (1-vinyl-3-alkylimidazolium), poly (1-allyl-3-alkylimidazolium), or of poly(1-(meth)acryloyloxy-3-alkylimidazolium).

The anion of the polymeric ionic liquid may comprise an organic or an inorganic anion. The anion of the polymer ionic liquid may include at least one of $CH_3COO—$, $CF_3COO—$, $CH_3SO_3$, $CF_3SO_3—$, $(CF_3SO_2)_2N—$, $(CF_3SO_2)_3C—$; $(CF_3CF_2SO_2)_2N—$, $C_4F_9SO_3—$, $C_3F_7COO—$, or $(CF_3SO_2)(CF_3CO)N—$.

The ionic liquid may be contained in the component in an amount of greater than 0 weight percent (wt %) to 30 wt %, based on a total weight of the first layer and the second layer. For example, the ionic liquid may be contained in the component in an amount from greater than 0 wt % to 30 wt %, 5 wt % to 25 wt %, or 10 wt % to 20 wt %, based on a total weight of the first layer and the second layer.

In an embodiment, the ionic liquid may be contained in the component in an amount of greater than 0 wt % up to 20 wt %, based on a total weight of the second layer. For example, the ionic liquid may be contained in the second layer in an amount greater than 0 wt % to 20 wt %, 2 wt % to 18 wt %, 4 wt % to 16 wt %, or 8 wt % to 14 wt %, based on a total weight of the second layer.

In an embodiment, the ionic liquid is present in a pore of the second layer.

In an embodiment, the ionic liquid may be contained in the second layer of the component in an amount of 50% to 100% of a total pore volume of the second layer. For example, the ionic liquid may be contained in the second layer in an amount of 50% to 100%, 60% to 98%, 70% to 96%, 80% to 94%, or 90% to 92%, based on a total pore volume of the second layer.

In an embodiment, a method of manufacturing a component for a hybrid battery comprises: providing a substrate having a porosity of 25% to 80%, based on a total volume of the substrate; heating the substrate; contacting the heated substrate with a mixture comprising a lithium precursor, a lanthanum precursor, an aluminum precursor, a zirconium precursor, and a solvent to form a lithium garnet on the substrate to manufacture the component, wherein the component comprises a first layer and a second layer, wherein the first layer comprises the lithium garnet and has a porosity of 0% to less than 25%, based on a total volume of the first layer, and wherein the second layer comprises the substrate.

The mixture may be provided using a single precursor composition, the precursor composition comprising a compound comprising nitrogen, a compound comprising lithium, a compound comprising lanthanum, and a compound comprising zirconium, and may further comprise a compound comprising aluminum. Suitable compounds for the precursor include at least one of an oxide, hydroxide, nitrate, azide, carbonate, oxalate, peroxide, acetate, or acetylacetonate.

Alternatively, the mixture may be provided by contacting a first precursor composition and a second precursor composition.

The first precursor composition comprises a lanthanum precursor, an aluminum precursor, a zirconium precursor, and a first solvent. Each of the lanthanum precursor, the aluminum precursor, and the zirconium precursor can be an oxide, hydroxide, nitrate, azide, carbonate, oxalate, peroxide, acetate, or acetylacetonate.

The second precursor composition comprises a lithium precursor and a second solvent, wherein the second solvent is the same or different than the first solvent. The lithium precursor comprises lithium azide and lithium nitrate, and may further comprise an oxide, hydroxide, nitrate, azide, carbonate, oxalate, peroxide, acetate, or acetylacetonate of lithium.

Representative precursor compounds comprising nitrogen include lithium nitrate, lithium azide, lanthanum nitrate, zirconium nitrate, or aluminum nitrate.

Representative precursor compounds comprising lithium include lithium oxide, lithium hydroxide, lithium nitrate, lithium azide, lithium carbonate, lithium oxalate, lithium peroxide, lithium acetate, or lithium acetoacetate.

Representative precursor compounds comprising lanthanum include lanthanum oxide, lanthanum hydroxide, lanthanum nitrate, lanthanum carbonate, lanthanum oxalate, lanthanum peroxide, lanthanum acetate, or lanthanum acetoacetate.

Representative precursor compounds comprising zirconium include zirconium oxide, zirconium hydroxide, zirconium nitrate, zirconium carbonate, zirconium oxalate, zirconium peroxide, zirconium acetate, or zirconium acetoacetate.

Representative precursor compounds comprising aluminum include aluminum oxide, aluminum hydroxide, aluminum nitrate, aluminum carbonate, aluminum oxalate, aluminum peroxide, aluminum acetate, or aluminum acetoacetate.

Also disclosed are precursor compounds that provide a combination of lithium, lanthanum, or zirconium, and optionally aluminum, e.g., a nitrate comprising a combination of lithium, lanthanum, or zirconium, and optionally aluminum.

If desired, the precursor compound may be a hydrate. For example, use of $La(NO_3)_3 \cdot 6H_2O$ or $Al(NO_3)_3 \cdot 9H_2O$ is mentioned.

Use of $Li_2O$ or Li—$N(LiN_3, Li_3N, LiNO_3)$ with at least one of BeO, CaO, $Sc_2O_3$, $Y_2O_3$, $HfO_2$, $La_2O_3$, $ZrO_2$, $BH_4$, or $P_2O_5$ is mentioned. The precursor compounds may also be a halogen containing compound, such as KCl, LiI, LiF, LiCl, LiBr, $SrCl_2$, or a glass formers, such as $SiO_2$. For example, the precursor composition may comprise $(1-x-y)LiN_3 + xHfO_2 + yP_2O_5$, where $0 \le x < 1$ and $0 \le y < 1$ and $x+y<1$. In an embodiment, when the precursor comprises $(1-x-y)LiN_3 + xHfO_2 + yP_2O_5$, x is 0.3 and y is 0.3, or x is 0.1 and y is 0.5.

The mixture for forming the dense layer may be a solution or a suspension of the precursor compound in the solvent. In an embodiment, the mixture is a solution of the precursor compounds in the solvent. Use of a suspension is mentioned.

The solvent may comprise at least one of a substituted or unsubstituted C1 to C20 alcohol, a substituted or unsubstituted C1 to C20 ester, a substituted or unsubstituted C2 to C20 carbonate, a substituted or unsubstituted C1 to C20 ketone, or water.

Use of a substituted or unsubstituted alcohol, a substituted or unsubstituted ester, a substituted or unsubstituted carbonate, a substituted or unsubstituted ketone, or a combination thereof is mentioned. In an embodiment, the solvent comprises a substituted or unsubstituted C1 to C6 alcohol. Use of methanol is mentioned. In an embodiment, disclosed is a composition for forming the solid-state electrolyte comprising a solution of the starting materials in methanol.

A boiling point of the solvent can be 0° C. to 150° C., 5° C. to 125° C., 10° C. to 100° C., or 20° C. to 80° C. In an embodiment, the solvent has a boiling point of 20° C. to 90° C.

The concentration of the precursor compound in the solvent may be a concentration which is suitable for spray pyrolysis. In an embodiment, the concentration of the precursor compound in the solvent is 0.001 to 1 molar (M), 0.005 to 0.5 M, or 0.01 to 0.1 M. Use of a precursor concentration of 0.02 to 0.08 M is mentioned.

In an embodiment, in a method of manufacturing a component for a hybrid battery, the contacting step comprises using spray pyrolysis of the mixture to form a lithium garnet on the surface of the substrate. In an embodiment, the heating step may comprise heating the substrate to a temperature from 200° C. to 450° C., wherein the substrate is heated during the contacting step. For example, the heating step may comprise heating the substrate to a temperature of 200° C. to 450° C., 250° C. to 400° C., or 300° C. to 350° C.

In an embodiment, the lithium garnet formed on the surface of the substrate comprises at least one of a compound of Formula 1 or a compound of Formula 2:

$$Li_{(7-3x)}M_xLa_3Zr_2O_{12}, \quad \text{Formula 1}$$

$$Li_{(7-3x)}M_xLa_3Zr_2O_{12-y}N_y, \quad \text{Formula 2}$$

wherein, in Formulae 1 and 2,
each M is independently at least one of H, Hf, W, Te, Al, Ta, Ba, Ga, Sr, Mg, Nb, Fe, Mo, Cs, Ca or Nd, and each x is independently $0 \le x \le 5$, and $0 \le y \le 6$.

In an embodiment, each M in Formulas 1 and 2 may independently be at least one of H, Hf, W, Te, Al, Ta, Ba, Ga, Sr, Mg, Nb, Fe, Mo, Cs, Ca or Nd. For example, each M may be H, Hf, Ca, or Al. Use of Al is mentioned.

In an embodiment, x in Formula 1 and x in Formula 2 is independently 0 to 5, for example, 0.1 to 4.9, 0.5 to 4.5, 1 to 4, 1.5 to 3.5, or 2 to 4. In an embodiment, in Formula 2, y is 0 to 6, for example, 0.1 to 5.9, 0.5 to 5.5, 1 to 5, 1.5 to 4.5, or 2 to 5.

In an embodiment, the method comprises annealing the first layer and the second layer at a temperature of 300° C. to 1200° C. The annealing temperature may be, for example, 300° C. to 1200° C., 400° C. to 1100° C., 500° C. to 1000° C., 600° C. to 900° C., or 700° C. to 800° C.

In an embodiment, a method for manufacturing a component comprises disposing an ionic liquid in a pore of the second layer of the component.

The ionic liquid is disclosed above, and a repetitive description thereof is not repeated here for clarity. In an embodiment, use of an alkyl ammonium cation, such as triethyl ammonium, an imidazolium cation such as ethyl methyl imidazolium or butyl methyl imidazolium, a pyrrolidium such as 1-methyl-1-propylpyrrolidium, or a methyl propylpiperidium is mentioned. An anion of bis(trifluorom ethylsulfonyl) imide (TFSI), bis (pentafluoroethylsufonyl) imide (BETI), tetrafluoroborate ($BF_4^-$), or hexafluorophosphate ($PF_6^-$) is mentioned. For example, the ionic liquid may be triethyl ammonium, ethyl methyl imidazolium, butyl methyl imidazolium, 1-methyl-1-propylpyrrolidium, methyl propylpiperidium, bis(trifluoromethylsulfonyl)imide, bis (pentafluoroethylsufonyl)imide, tetrafluoroborate, hexafluorophosphate, poly(1-vinyl-3-alkylimidazolium), a cation of poly(1-allyl-3-alkylimidazolium), or a cation of poly(1-(meth)acryloyloxy-3-alkylimidazolium).

The ionic liquid may be contained in the component in an amount greater than 0 wt % up to 30 wt %, based on a total weight of the first layer and the second layer. For example, the ionic liquid may be contained in the component in an amount from greater than 0 wt % to 30 wt %, 5 wt % to 25 wt %, or 10 wt % to 20 wt %, based on a total weight of the first layer and the second layer.

In an embodiment, the ionic liquid may be contained in the component in an amount greater than 0 wt % up to 20 wt %, based on a total weight of the second layer. For example, the ionic liquid may be contained in the second layer in an amount greater than 0 wt % to 20 wt %, 2 wt % to 18 wt %, 4 wt % to 16 wt %, or 8 wt % to 14 wt %, based on a total weight of the second layer.

In an embodiment, the ionic liquid may be contained in the second layer of the component in an amount of 50% to 100% of a total pore volume of the second layer. For example, the ionic liquid may be contained in the second layer in a volume equivalent to 50% to 100%, 60% to 100%, 70% to 100%, 80% to 100%, or 90% to 100%, based on a total pore volume of the second layer.

In an embodiment, the method comprises annealing the first layer and the second layer at a temperature of 300° C. to 1200° C. The annealing temperature may be, for example, 400° C. to 1100° C., 500° C. to 1000° C., 600° C. to 900° C., or 700° C. to 800° C.

In an embodiment, the first layer of the component has a thickness of 0.1 µm to 40 µm, and the second layer of the component has a thickness of 10 µm to 150 µm. For example, the first layer of the component may have a thickness of 0.1 µm to 40 µm, 0.5 µm to 35 µm, 1 µm to 30 µm, 5 µm to 25 µm, or 10 µm to 20 µm and the second layer may have a thickness of 10 µm to 150 µm, 15 µm to 125 µm, 20 µm to 100 µm, or 30 µm to 75 µm.

In an embodiment, the first layer of the component does not react with lithium, i.e., the first layer is stable when contacted with lithium.

The second layer in the component is porous. The second layer has an average pore diameter in the second layer is 1 nm to 50 nm. A pore diameter in the second layer may be, for example 1 nm to 50 nm, 5 nm to 45 nm, 10 nm to 40 nm, 15 nm to 35 nm, or 20 nm to 30 nm.

In an embodiment, a battery may comprise a component as described herein. In an embodiment, a lithium battery may comprise: a positive electrode; a negative electrode comprising at least one of lithium or a lithium alloy; and a component between the positive electrode and the negative electrode, wherein the first layer of the component is proximate to the negative electrode and the second layer is proximate to the positive electrode, and wherein the second layer of the component comprises an ionic liquid within a pore thereof.

In an embodiment, a lithium battery may comprise: a positive electrode; a negative electrode comprising at least one of lithium or a lithium alloy; and a component between the positive electrode and the negative electrode, wherein the first layer of the component is proximate to the positive electrode and the second layer is proximate to the negative electrode, and wherein the second layer of the component comprises an ionic liquid within a pore thereof.

The positive electrode can be prepared by forming a positive active material layer including a positive active material on a current collector. The current collector may comprise aluminum, for example.

The positive active material can comprise a lithium transition metal oxide, a transition metal sulfide, or the like. For example, the positive active material can include a composite oxide of lithium and a metal selected from cobalt, manganese, and nickel. For example, the positive active material can be a compound represented by any of the Formulas: $Li_aA_{1-b}M_bD_2$ wherein $0.90 \leq a \leq 1.8$ and $0 \leq b \leq 0.5$; $Li_aA_{1-b}M_bO_{2-c}D_c$ wherein $0.90 \leq a \leq 1.8$, $0 \leq b \leq 0.5$, and $0 \leq c \leq 0.05$; $LiE_{2-b}M_bO_{4-c}D_c$ wherein $0 \leq b \leq 0.5$ and $0 \leq c \leq 0.05$; $Li_aNi_{1-b-c}Co_bM_cD_\alpha$ wherein $0.90 \leq a \leq 1.8$, $0 \leq b \leq 0.5$, $0 \leq c \leq 0.05$, and $0 \leq \alpha \leq 2$; $Li_aNi_{1-b-c}Co_bM_cO_{2-\alpha}X_\alpha$ wherein $0.90 \leq a \leq 1.8$, $0 \leq b \leq 0.5$, $0 \leq c \leq 0.05$, and $0 \leq \alpha \leq 2$; $Li_aNi_{1-b-c}Co_bM_cO_{2-\alpha}X_\alpha$ wherein $0.90 \leq a \leq 1.8$, $0 \leq b \leq 0.5$, $0 \leq c \leq 0.05$, and $0 \leq \alpha \leq 2$; $Li_aNi_{1-b-c}Mn_bM_cD_c$, wherein $0.90 \leq a \leq 1.8$, $0 \leq b \leq 0.5$, $0 \leq c \leq 0.05$, and $0 \leq \alpha \leq 2$; $Li_aNi_{1-b-c}Mn_bM_cO_{2-\alpha}X_\alpha$ wherein $0.90 \leq a \leq 1.8$, $0 \leq b \leq 0.5$, $0 \leq c \leq 0.05$, and $0 \leq \alpha \leq 2$; $Li_aNi_{1-b-c}Mn_bM_cO_{2-\alpha}X_\alpha$ wherein $0.90 \leq a \leq 1.8$, $0 \leq b \leq 0.5$, $0 \leq c \leq 0.05$, and $0 \leq \alpha \leq 2$; $Li_aNi_bE_cG_dO_2$ wherein $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ wherein $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ wherein $0.90 \leq a \leq 1.8$ and $0.001 \leq b \leq 0.1$; $Li_aCoG_bO_2$ wherein $0.90 \leq a \leq 1.8$ and $0.001 \leq b \leq 0.1$; $Li_aMnGbO_2$ where $0.90 \leq a \leq 1.8$ and $0.001 \leq b \leq 0.1$; $Li_aMn_2GbO_4$ wherein $0.90 \leq a \leq 1.8$ and $0.001 \leq b \leq 0.1$; $QO_2$; $QS_2$; $LiQS_2$; $V_2O_5$; $LiV_2O_2$; $LiRO_2$; $LiNiVO_4$; $Li_{(3-f)}J_2(PO_4)_3$ ($0 \leq f \leq 2$); $Li_{(3-f)}Fe_2(PO_4)_3$ wherein $0 \leq f \leq 2$; and $LiFePO_4$, in which in the foregoing positive active materials A is Ni, Co, or Mn; M is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu. Examples of the positive active material include $LiCoO_2$, $LiMn_xO_{2x}$ where x is 1 or 2, $LiNi_{1-x}Mn_xO_{2x}$ where $0<x<1$, $LiNi_{1-x-y}Co_xMn_yO_2$ where $0 \leq x \leq 0.5$ and $0 \leq y \leq 0.5$, $LiFePO_4$, $TiS_2$, $FeS_2$, $TiS_3$, and $FeS_3$.

The positive active material layer may further include a conductive agent and a binder. Any suitable conductive agent and binder may be used.

A binder can facilitate adherence between components of the electrode, such as the positive active material and the conductor, and adherence of the electrode to a current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, or a copolymer thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the electrode to the current collector may be suitably strong.

The conductive agent can include, for example, at least one of carbon black, carbon fiber, graphite, carbon nanotubes, or graphene. The carbon black can be, for example, acetylene black, Ketjen black, Super P carbon, channel black, furnace black, lamp black, or thermal black. The graphite can be a natural graphite or an artificial graphite. A combination comprising at least one of the foregoing conductive agents can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing additional conductors can be used.

The positive active material layer may be prepared by screen printing, slurry casting, or powder compression. However, the solid-state method is not limited thereto, and any suitable method may be used. The current collector may comprise aluminum, for example.

The positive electrode can further comprise an electrolyte. When present, the electrolyte can comprise at least one of a solid-state electrolyte or a polymeric electrolyte.

The polymeric electrolyte may comprise at least one of an ionically conductive polymer. Exemplary ionically conductive polymers can include but are not limited to polyethylene oxide, polyethylene oxide comprising a metal salt, poly (methyl (meth)acrylate), polypropylene oxide, polyvinylidene fluoride, polystyrene, polyvinyl chloride, polyvinyl alcohol, polyacrylonitrile, or polyester sulfide. The ionically conductive polymer can optionally further comprise a lithium salt, for example $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C2F_5)_2$, $LiC(SO_2CF_3)_3$, $LiN(SO_3CF_3)_2$, $LiC_4F_9SO_3$, or $LiAlCl_4$. In an embodiment, the ionically conductive polymer comprises the lithium salt, and is preferably a polyethylene oxide comprising the lithium salt.

The component may be included between the positive electrode and negative electrode. In an embodiment, the component consists of the dense layer. In an embodiment the component comprises a glass fiber, polyester, polyethylene, polypropylene, or polytetrafluoroethylene (PTFE). In an embodiment, the component may comprise a microporous polymeric film, such as a microporous polyethylene or microporous polypropylene film. In an embodiment, the component comprises the solid-state electrolyte and a porous olefin film such as polyethylene and polypropylene.

In an embodiment, the electrochemical cell comprises a porous layer on the dense layer. For example, the electrochemical cell may comprise a porous layer comprising a microporous polyethylene film having a pore size of 1 µm to 50 µm, 2 to 40 µm, or 5 µm to 30 µm, and a dense layer on the porous layer.

In an embodiment, the negative active material is disposed on a current collector, such as copper current collector. Use of lithium metal or a lithium metal alloy is mentioned. The negative electrode active material can further comprise a carbon, such as a hard carbon, soft carbon, carbon black, ketjen black, acetylene black, activated carbon, carbon nanotubes, carbon fiber, graphite, or an amorphous carbon. Also usable are lithium-containing metals and alloys, for example a lithium alloy comprising Si, Sn, Sb, or Ge. Lithium-containing metal oxides, metal nitrides, and metal sulfides are also useful, in particular wherein metal can be Ti, Mo, Sn, Fe, Sb, Co, or V. Also useable are phosphorous (P) or metal doped phosphorous (e.g., $NiP_3$). The negative active material is not limited to the foregoing and any suitable negative active material can be used.

The negative electrode can be produced from a negative active material composition including a negative active material, and optionally, a conductive agent, and a binder. A suitable negative active material includes a material capable of storing and releasing lithium ions electrochemically. The electrochemical cell can be made by a method comprising disposing the component between a positive electrode and a negative electrode and inserting the assembly into a can, for example, to provide the electrochemical cell.

In an embodiment, a nitride is deposited on the porous layer. The nitride may either remain or be annealed away to provide cubic single phase $Li_{7-3x}Al_xLa_3Zr_2O_{12}$ (LLZO). In an embodiment, a dense LLZO layer can be provided, e.g., deposited, on a porous yttria-stabilized zirconia (YSZ) substrate to provide the first layer and the second layer.

The second layer may comprise any suitable material, and may comprise an oxide, carbide, nitride, or a metal. A second layer comprising an aluminum oxide comprising iron, titanium, chromium, copper, or magnesium, MgO, $Al_2O_3$, $SiO_2$, indium tin oxide, zinc oxide, indium tin zinc oxide, SiC, Ti, Ni, or stainless steel. Use of MgO is mentioned.

In an embodiment, the second layer may be, for example, a thin porous and rigid high temperature ceramic. The second layer may include, but is not limited to, yttria stabilized zirconia (YSZ, e.g., 3 mol % Y-doping), which is stable up to about 850° C., $Al_2O_3$, which is available in a dense form as thin as 19 microns and is stable up to about 900° C., anodized alumina oxide, which is stable up to about 500° C. with LLZO, or MgO, which is the stable at temperatures equal to and greater than 1200° C.

In an embodiment, the second layer may be, for example, a porous flexible substrate and may include, but is not limited to, ceramic fabric, borosilicate mesh, and polyimide porous high temperature polymers that are stable up to about 400° C.

In an embodiment, precursor materials for a dense layer may include, for example, $Li_2O$ or Li—$N(LiN_3$, $Li_3N$, or $LiNO_3$) with BeO, CaO, $Sc_2O_3$, $Y_2O_3$, $HfO_2$, $La_2O_3$, $ZrO_2$, $BH_4$, $P_2O_5$. The dense layer may also comprise halogen containing compounds such as KCl, LiI, LiF, LiCl, LiBr, $SrCl_2$, or certain glass formers such as $SiO_2$. For example, the dense layer may comprise $(1-x-y)LiN_3+xHfO_2+yP_2O_5$, where $0 \leq x < 1$ and $0 \leq y < 1$ and $x+y<1$. The dense layer forms a dense film at low temperatures and is not reactive with lithium metal.

In an embodiment, the bilayer component is not exposed to temperatures above 250° C., which makes it suitable for use with a variety of polymers and many glass fiber porous substrates.

In an embodiment, the dense layer of the component can be provided by spray-pyrolysis synthesis allowing for thin-film fabrication, which allows for a crystalline or amorphous dense layer with high conductivity and good stability against lithium metal reduction.

The bilayer component may be used to provide a solid-state separator, e.g., to electrically separate a positive electrode and a negative electrode of a lithium-ion or a lithium metal battery. In an embodiment, the bilayer component may be used as protection layer on lithium metal to provide a protected lithium-metal negative electrode having improved stability. In an embodiment, the material is an Hf-containing garnet-type oxide material and provides an improved combination of conductivity and stability against lithium metal.

In an embodiment, a bilayer component that can be integrated into a hybrid-type cell is provided. In an embodiment, the component comprises a continuous film of amorphous or crystalline $Li_{7-3x}Al_xLa_3Zr_2O_{12}$ (LLZO) and N-doped $Li_{7-3x}Al_xLa_3Zr_2O_{12-y}N_y$ (N-LLZO) on a rigid or flexible, porous ceramic substrate to form a bilayer component that can be fully integrated into a lithium metal hybrid battery. In an embodiment, the bilayer is formed using a solution-based technique such as spray pyrolysis to grow dense LLZO/N-LLZO films with a thickness of 1 µm to 20 µm. A battery comprising the component may cycle>15 times at the designed capacity (0.42 mAh) at 0.1 C (0.139 mA) for a hybrid-type cell.

Lithium lanthanum zirconium oxide (LLZO) garnet-type solid-state electrolytes are currently synthesized by bulk-type methods, e.g., sintering a pressed pellet, or sintering a compressed tape. The products of the bulk-type methods can have desirable conductivity, however the processing methods, while suitable for laboratory setting, are difficult to economically implement in a manufacturing environment. Alternatively, methods to provide thin-films of LLZO by vacuum techniques are known, however such methods are economically unsuitable for scalable production.

The disclosed method provides a bilayer component having desirable thickness and conductivity, and selective surface morphology. Also, the disclosed method is scalable and has associated costs that are suitable for commercial manufacturing.

A schematic diagram of the disclosed method is provided in FIG. 1. In the disclosed method, a film 130 of a precursor composition 100 is first formed on a second layer 110 to form a bilayer component 120 comprising the second layer 110 having the precursor composition 100 thereon. The bilayer component 120 is then annealed at 300° C. to 1200° C. to manufacture the bilayer component 120. As is further disclosed herein, the method provides a film of the garnet-type solid-state electrolyte with thickness of 1 µm to 40 reduced defect content, and a desirable content of $Li_{(7-x)}Al_{x/3}La_3Zr_2O_{12}$ (c-LLZO) and $Li_{7-3x}Al_xLa_3Zr_2O_{12-y}N_y$ (N-LLZO).

The annealing can be conducted in any suitable atmosphere. Annealing in air or oxygen ($O_2$) is mentioned. In an embodiment, the annealing is conducted in a gas comprising oxygen at a content greater than that in air, e.g., a gas comprising 21% to 100%, 25% to 90%, or 30% to 80% oxygen, based on a total volume of the gas.

Figure 2:
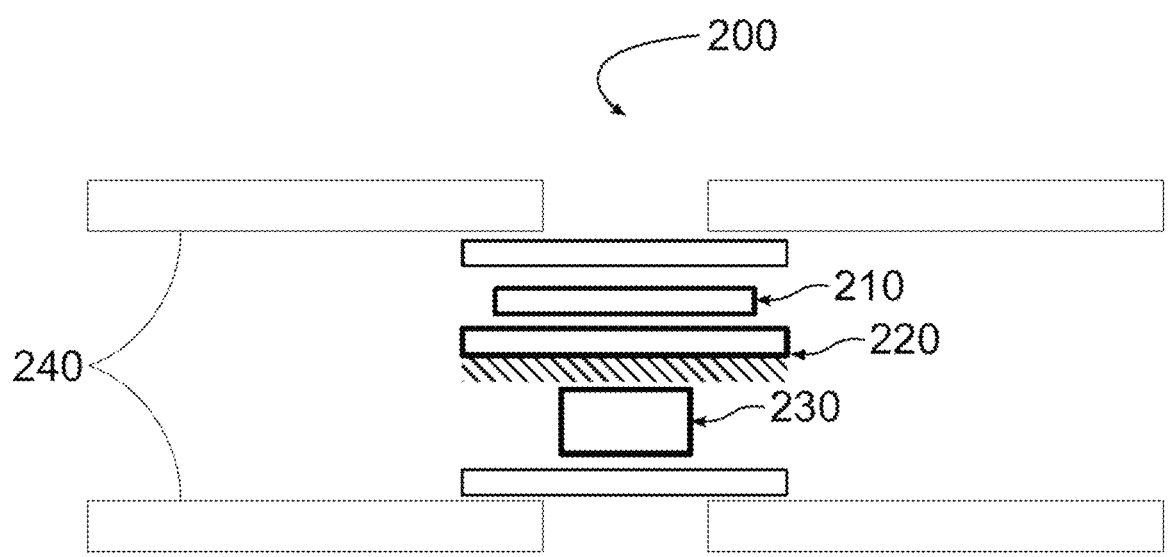
FIG. 2 is a schematic diagram of an embodiment of a lithium battery.

Also disclosed is a lithium battery comprising the component in at least one of a positive electrode, a bilayer component, or a negative electrode, wherein the electrochemical cell 200 is enclosed in a pouch 240. As shown in the electrochemical cell 200 of FIG. 2, the negative electrode 210 can be used in combination with a positive electrode 230 comprising the positive active material and a bilayer component 220, e.g., the component being a separator, provided between the positive electrode and the negative electrode.

Figure 3:
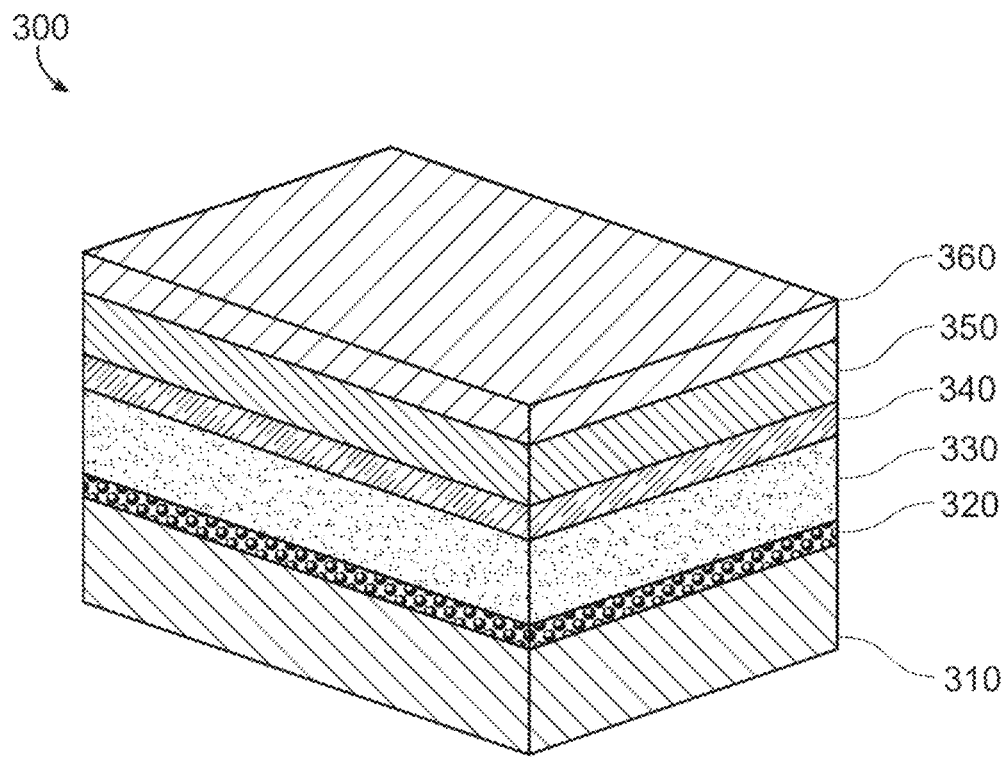
FIG. 3 is a schematic diagram of an embodiment of a lithium battery.

In an embodiment, as shown in FIG. 3, an electrochemical cell 300 may comprise a porous layer 330 on the dense layer 340. Shown in FIG. 3 is a positive electrode current collector 310, a positive electrode 320 comprising a positive electrode active material and a liquid electrolyte, a porous layer 330, the dense layer 340, a negative electrode 350, and a negative electrode current collector 360.

Figure 4:
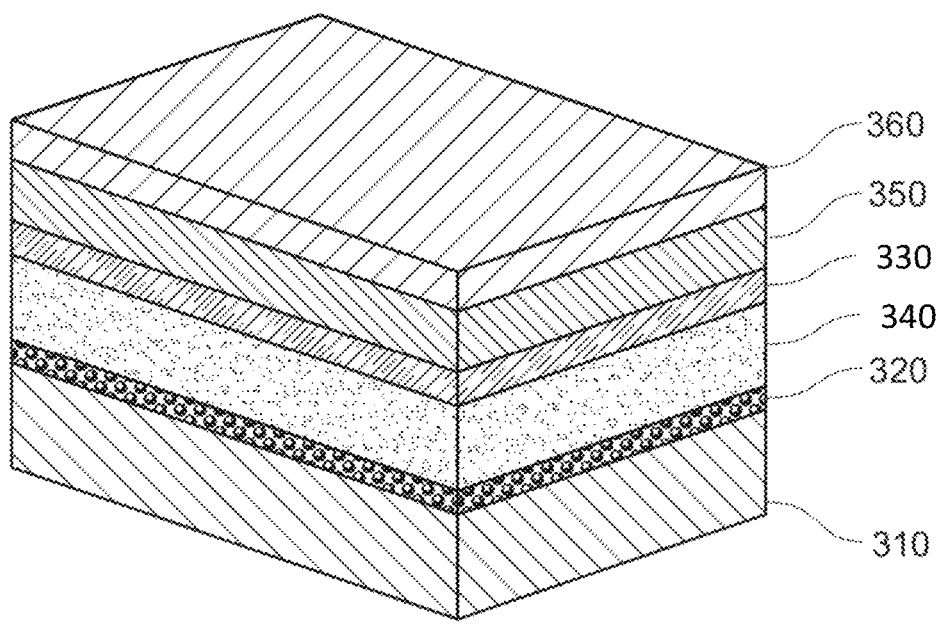
FIG. 4 is a schematic diagram of an embodiment of a lithium battery.

In an embodiment as shown in FIG. 4, an electrochemical cell 400 may comprise a dense layer 340 on a porous layer 330. Shown in FIG. 4 is a positive electrode current collector 310, a positive electrode 320 comprising a positive electrode active material and a liquid electrolyte, a dense layer 340, the porous layer 330, a negative electrode 350, and a negative electrode current collector 360.

Figure 5:
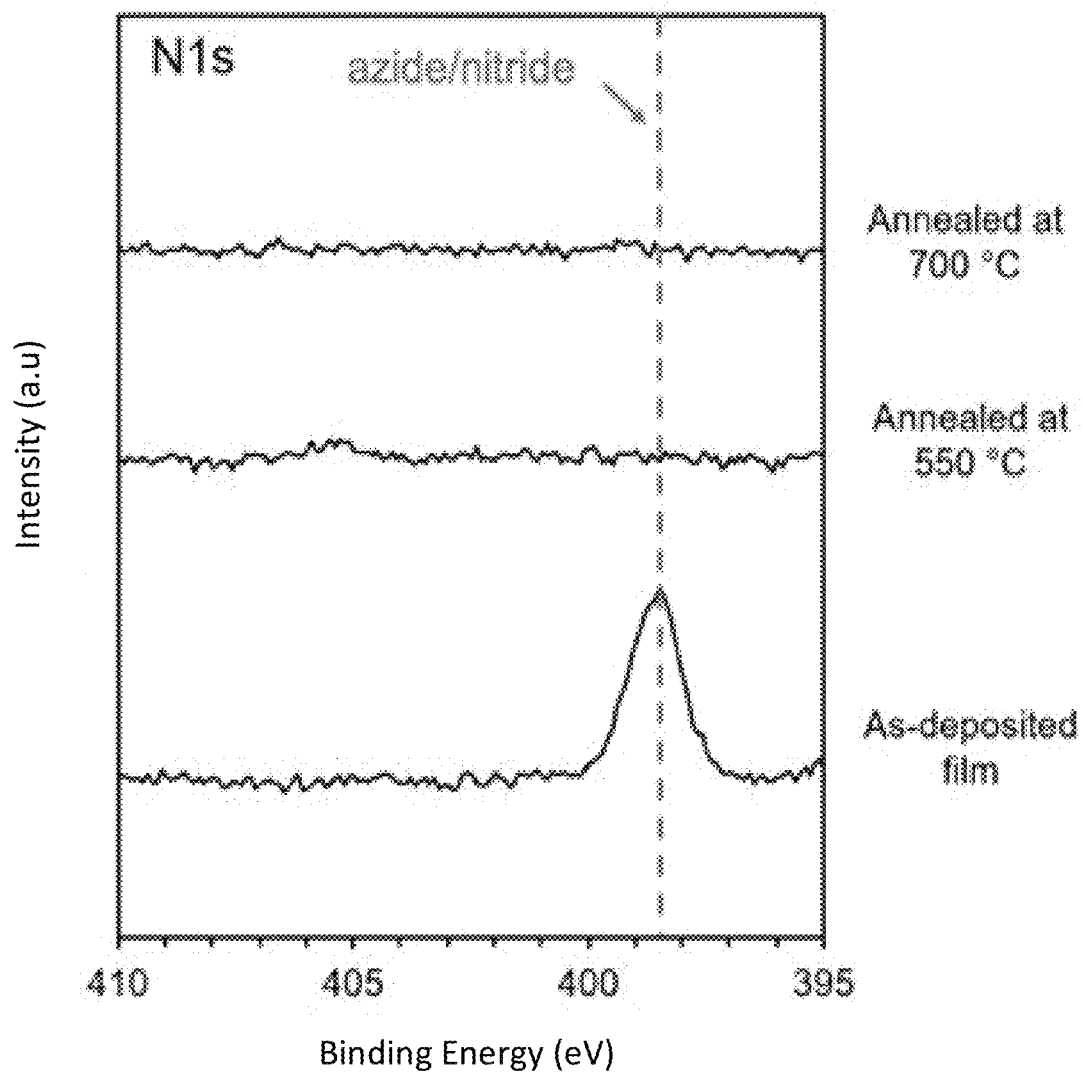
FIG. 5 is a graph of intensity (arbitrary units, a.u.) versus binding energy (electron volts, eV) showing the results of X-Ray photoelectron spectroscopy (XPS) analysis of Example 1.

In an embodiment as shown in FIG. 5, a porous layer 330 is coated with a dense layer 340. The dense layer is deposited using spray pyrolysis to form a bilayer component, wherein the component has an overall thickness of 40 µm to 250 µm.

Figure 6A:
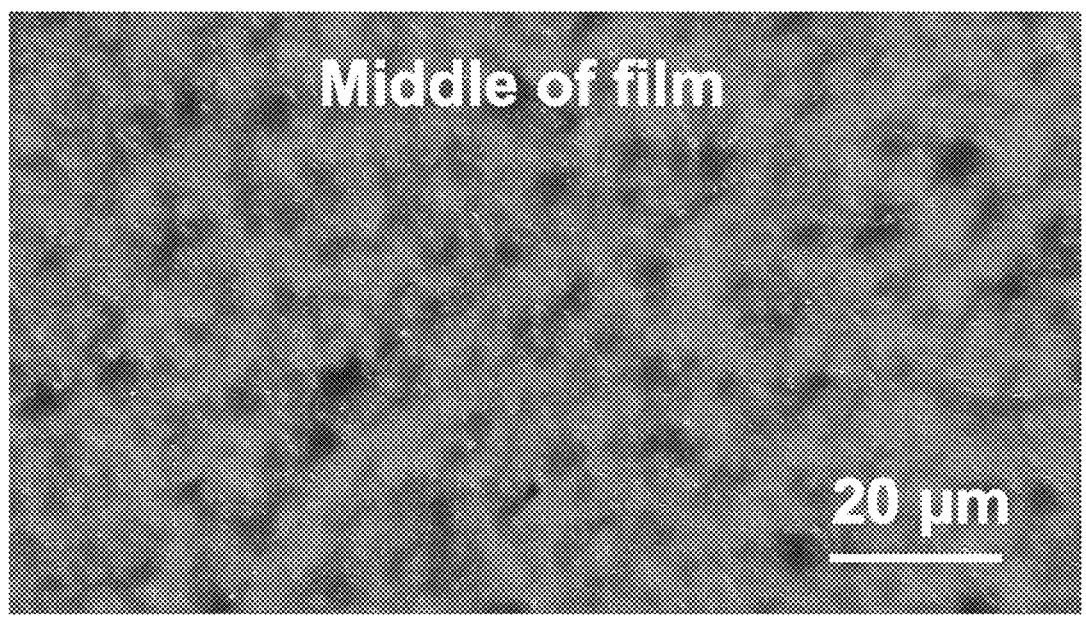
FIG. 6A is a scanning electron microscope (SEM) image of a surface of a dense layer of the component of Example 1, taken from the middle of the component.
Figure 6B:
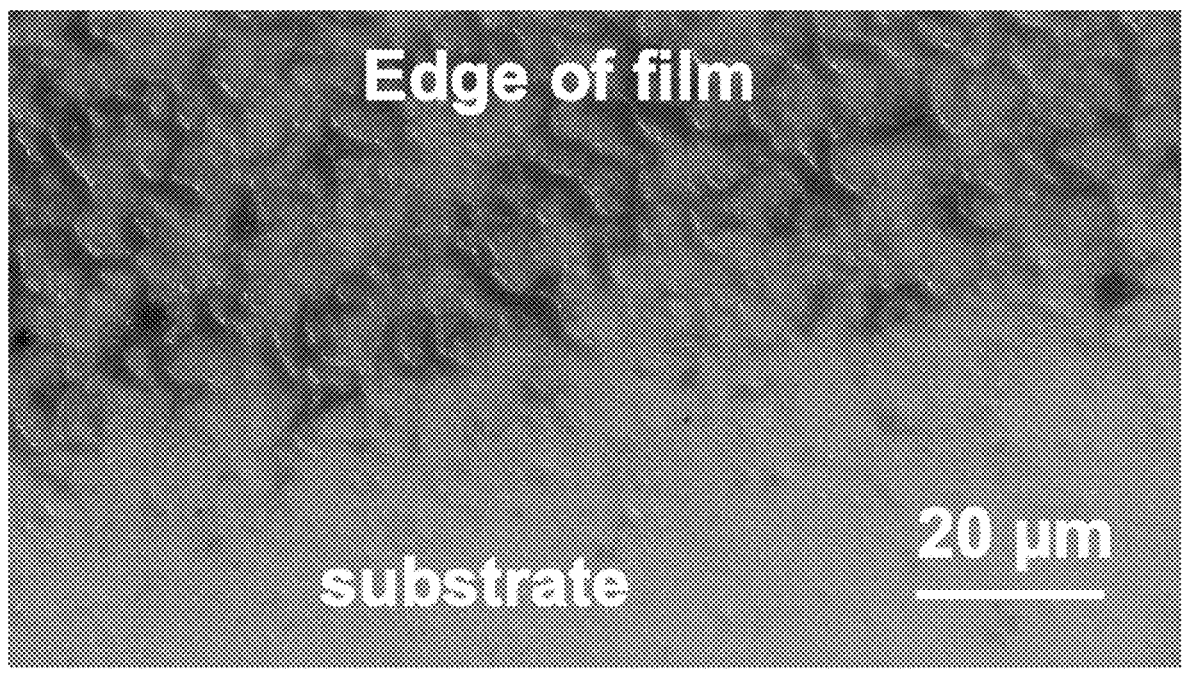
FIG. 6B is a scanning electron microscope (SEM) image of a surface of a dense layer of the component of Example 1, taken from the edge of the component.
Figure 6C:
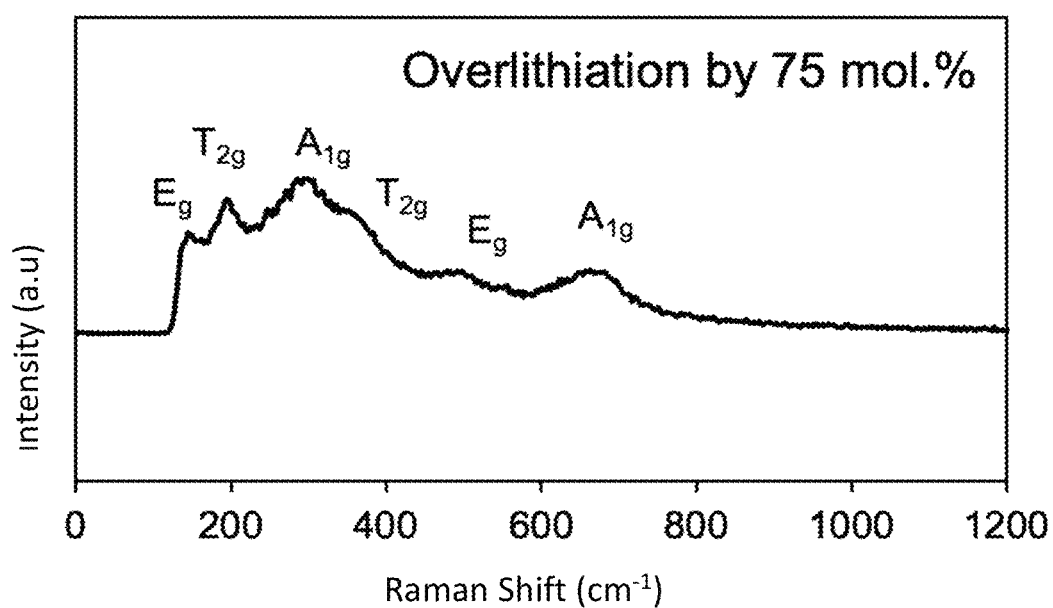
FIG. 6C is a graph of intensity (arbitrary units, a.u.) versus wavenumber ($cm^{-1}$) showing the results of in-situ Raman analysis of Example 1 prior to annealing, Example 1 after annealing, and Example 2 after annealing.

Shown in FIG. 6C is a graph of intensity (arbitrary units, a.u.) versus binding energy (electron volts, eV) showing the results of X-Ray photoelectron spectroscopy (XPS) analysis of Example 1. As seen in FIG. 6C, the azide and/or nitride in the as-deposited film may be annealed away at annealing temperatures greater than 550° C.

Figure 7A:
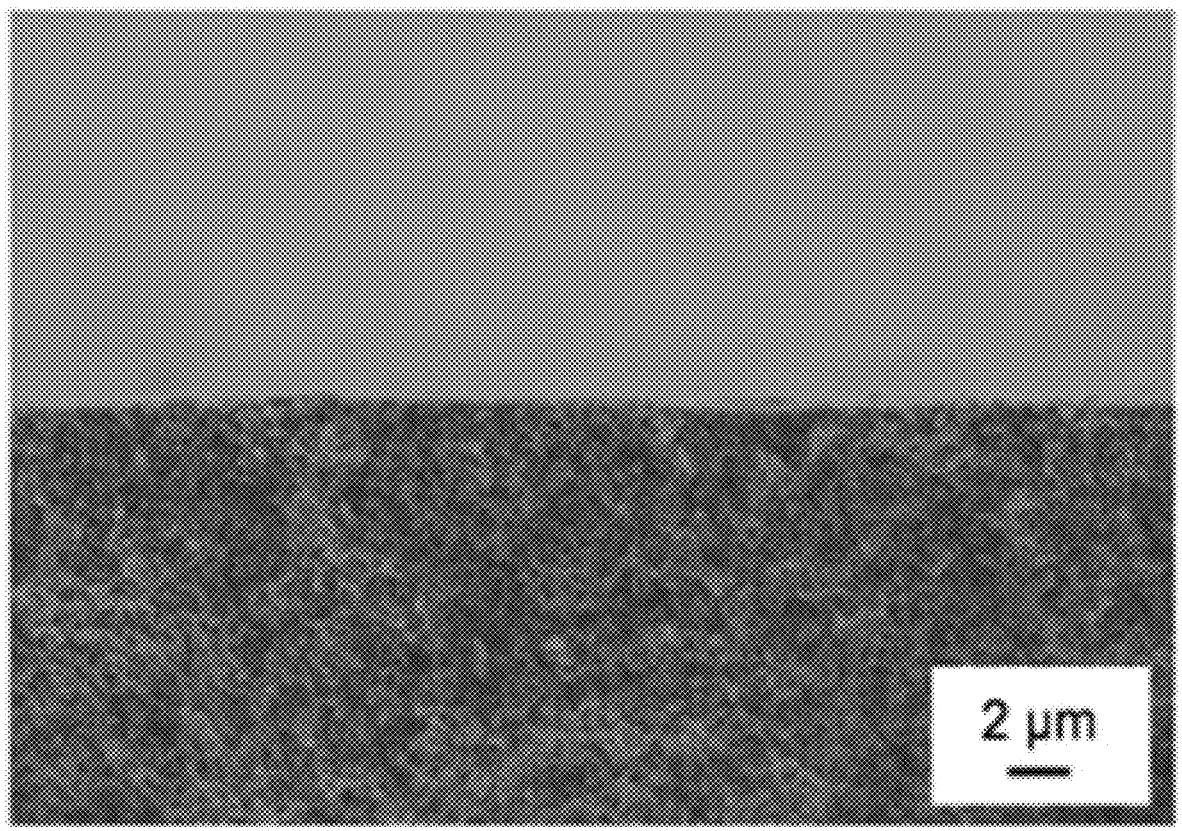
FIG. 7A and FIG. 7B are SEM images of a cross-section of the component of Example 1.
Figure 7B:
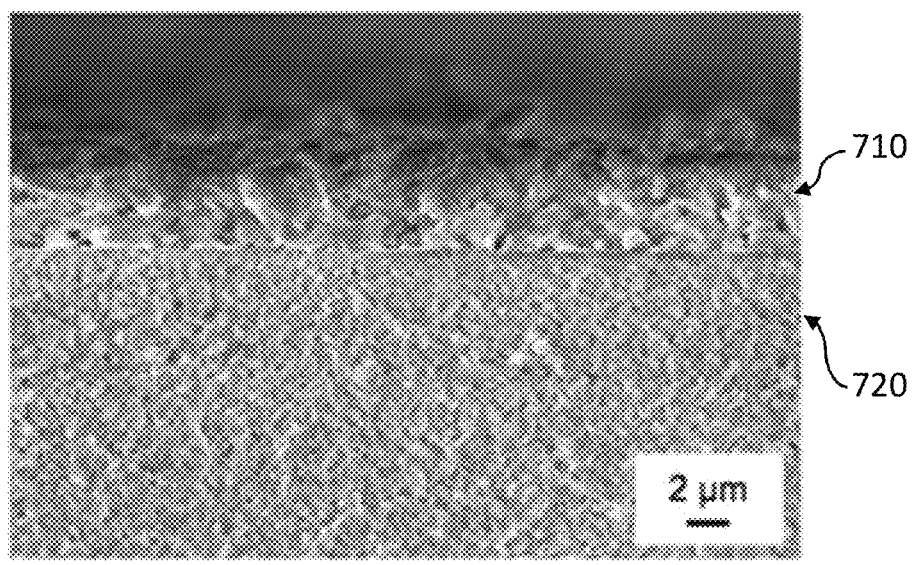
Figure 7C:
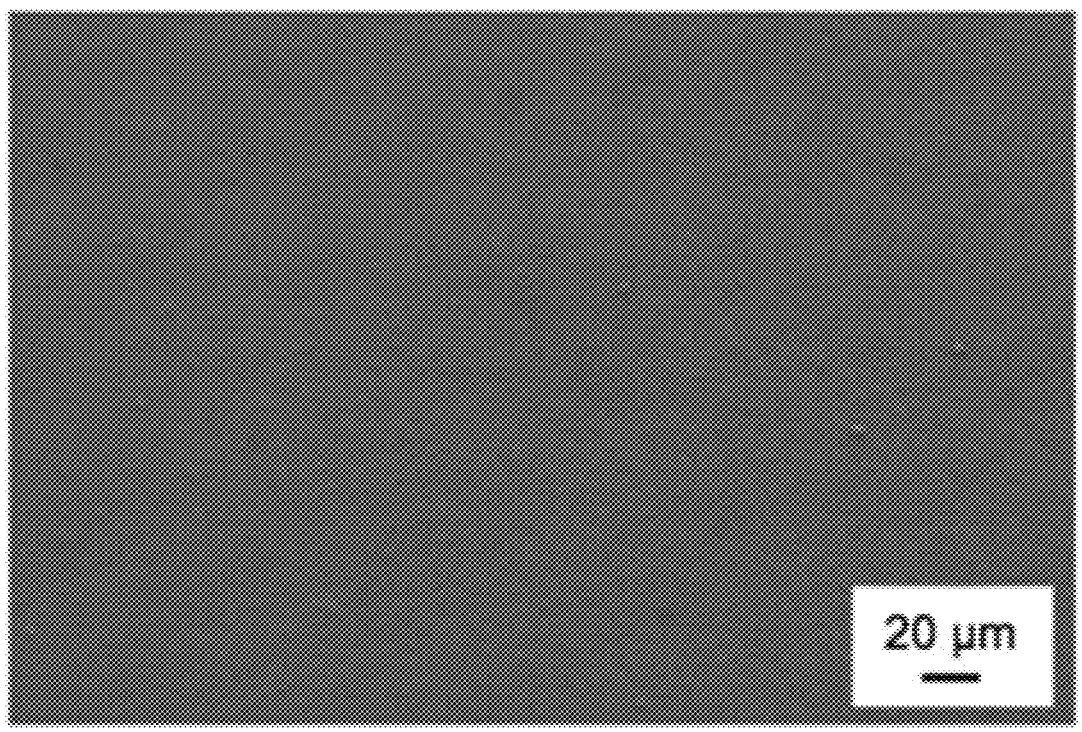
FIG. 7C and FIG. 7D are SEM images of the surface of the dense layer of Example 1.
Figure 7D:
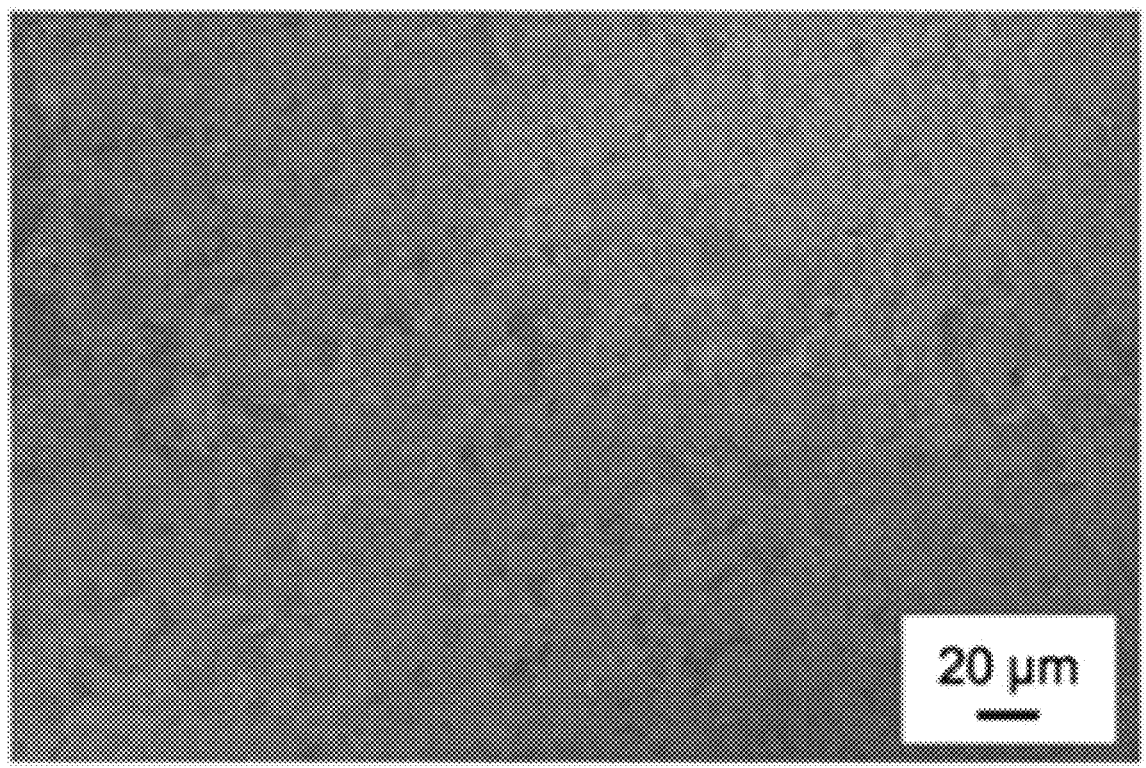

FIG. 7A and FIG. 7B are cross-sectional views of the bilayer component of Example 1. FIG. 7B illustrates the lithium garnet 710 on the YSZ substrate 720. As seen in FIG. 7C and FIG. 7D, the component has a dense lithium garnet layer on a porous substrate such as YSZ.

FIG. 7B is a top-down view of the surface of the dense layer of the bilayer component of Example 1. As seen in FIG. 7B, the component has a uniform, dense lithium garnet layer.

Figure 8:
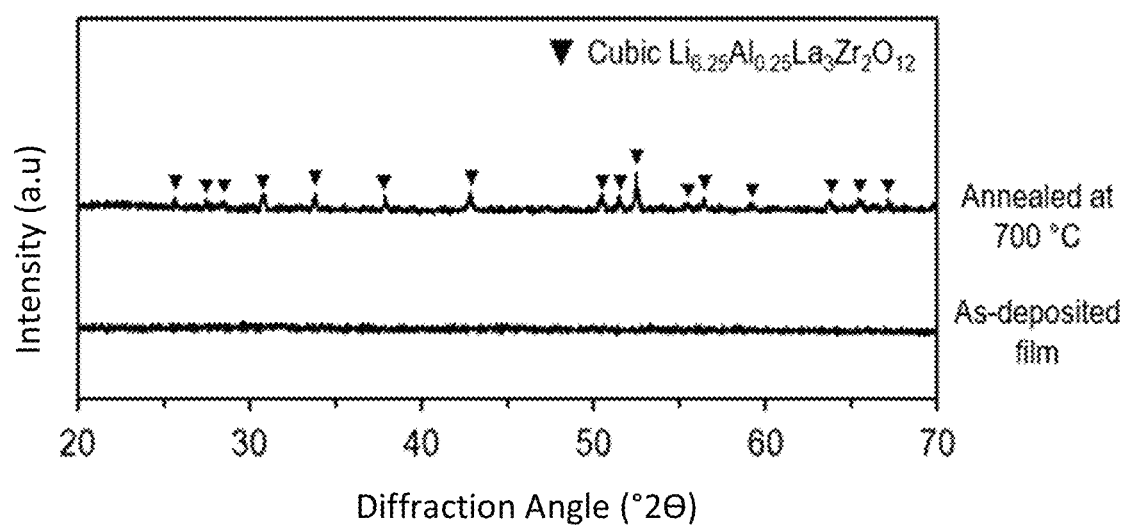
FIG. 8 is a graph of intensity (arbitrary units) versus diffraction angle (° 2θ) that shows the results of powder X-ray diffraction (XRD) analysis, using Cu Kα radiation, of the dense layer prepared according to Example 1, prior to annealing, and Example 2, after annealing.

FIG. 8 is a graph of intensity (arbitrary units) versus diffraction angle (° 2θ) that shows the results of powder X-ray diffraction (XRD) analysis, using Cu Kα radiation of the dense layer prepared according to Example 1. FIG. 8 shows the XRD results of Example 1 as deposited (prior to annealing) and Example 2 after annealing at a temperature of 700° C. FIG. 8 also contains calculated peak position locations based on a cubic LLZO structure.

Hereinafter an embodiment is described in detail. The examples are provided for illustrative purposes only and are not intended to limit the scope of the present disclosure.

EXAMPLES

Example 1. Preparation of LLZO/N-LLZO dense layer on porous substrate

All chemicals can be used as received without further purification. $LiN_3$ (≥99%), and zirconium(IV) acetylacetonate (97%) were purchased from SIGMA-ALDRICH; $Al(NO_3)_3 \cdot 9H_2O$ and $La(NO_3)_3 \cdot 6H_2O$ (99.99%) were purchased from ALFA AESAR; methanol and 1-methoxy-2-propanol bis(2-ethylhexyl)phthalate were purchased from VWR INTERNATIONAL; and YSZ (100) substrates were purchased from MTI CORPORATION.

A first precursor composition was prepared by dissolving stoichiometric ratios of the La, Al, and Zr salts in methanol and 1-methoxy-2-propanol bis(2-ethylhexyl)phthalate. A second precursor composition was prepared by adding a 250% stoichiometric excess of the Li salt, $Li_{7-3x}Al_xLa_3Zr_2O_{12-y}N_y$ (N-LLZO), wherein 0<x<0.3 and 0<y<6, at a concentration of 0.03 mole of per liter in methanol and 1-methoxy-2-propanol bis(2-ethylhexyl) phthalate. The precursor compositions were combined to form a precursor mixture immediately prior to atomization to prevent flocculation prior to being deposited on the substrate. The substrate was maintained at a temperature of 300° C. during deposition of the precursor mixture.

Spray pyrolysis was used to transfer the precursor mixture on to the surface of a 1 cm×1 cm YSZ substrate to provide a film of the precursor mixture on the YSZ substrate. The resulting film formed on the YSZ substrate has a thickness of 10 µm. The thickness of the YSZ substrate was 40 µm, thus the bilayer component had a total thickness of 50 µm.

The bilayer component was then annealed at a temperature of 550° C. for 2 hours.

Example 2. Preparation of LLZO/N-LLZO Dense Layer on Porous Substrate

All chemicals can be used as received without further purification. $LiN_3$ (≥99%), and Zirconium(IV) acetylacetonate (97%) were purchased from SIGMA-ALDRICH; $Al(NO_3)_3 9H_2O$ and $La(NO_3)_3 \cdot 6H_2O$ (99.99%) were purchased from ALFA AESAR; methanol and 1-methoxy-2-propanol bis(2-ethylhexyl)phthalate were purchased from VWR INTERNATIONAL; and YSZ (100) substrates were purchased from MTI CORPORATION.

A first precursor composition was prepared by dissolving stoichiometric ratios of the La, Al, and Zr salts in methanol and 1-methoxy-2-propanol bis(2-ethylhexyl)phthalate. A second precursor composition was prepared by adding a 75% stoichiometric excess of the Li salt, $Li_{7-3x}Al_xLa_3Zr_2O_{12-y}N_y$ (N-LLZO), wherein $0<x<0.3$ and $0<y<6$, at a concentration of 0.03 mole of per liter in methanol and 1-methoxy-2-propanol bis(2-ethylhexyl) phthalate. The precursor compositions were combined to form a precursor mixture immediately prior to atomization to prevent flocculation prior to being deposited on the substrate. The substrate was maintained at a temperature of 300° C. during deposition of the precursor mixture.

Spray pyrolysis was used to transfer the precursor mixture on to the surface of a 1 cm×1 cm YSZ substrate. The resulting film formed on the YSZ substrate has a thickness of 10 μm. The thickness of the YSZ substrate was 40 μm, thus the bilayer component had a total thickness of 50 μm.

The bilayer component was then annealed at a temperature of 700° C. for 2 hours.

X-ray Photoelectron Analysis

X-ray photoelectron spectroscopy (XPS) for N1s was performed using a THERMO K-Alpha XPS system with a spot size of 400 μm and a resolution of 0.1 eV.

Shown in FIG. 5 are XPS results for Examples 1 and 2. From the XPS results, nitrogen is observed to be present in the precursor film as deposited but not in the solid-state electrolyte of Examples 1 and 2. While not wanting to be bound by theory, it is understood that these results indicate complete decomposition of the precursors after annealing, e.g., above 550° C., to provide a single cubic phase LLZO film.

In-Situ Raman Analysis

The bilayer component of Example 1 was evaluated by Raman analysis, the results of which are shown in FIG. 6C, using a WITec instrument with a spectral resolution of 0.7 $cm^{-1}$ at 10 mW and a wavelength of 532 nm to ensure low penetration depths. Increasing the annealing temperature in Example 2 to 700° C. resulted in only a cubic phase being observed. These results are understood to indicate that complete decomposition of the precursor mixture proceeds with increasing annealing temperature. The azide/nitride content in the film decreases significantly between the as-deposited film and the film after annealing at a temperature of 700° C.

SEM Analysis

Scanning electron microscopy (SEM) images were collected on a ZEISS Supra55VP field emission scanning electron microscope operated from 3.0 to 10.0 kV using both the in-lens secondary electron (SE) and the Everhart-Thornley SE detectors. Samples were cross sectioned with a diamond blade and attached to sample stage with carbon-conductive tape. The results of the SEM analysis of the component of Example 1 (550° C.) are shown in FIGS. 7A-7D. As shown in FIG. 7A and FIG. 7B, on the YSZ substrate is a 10 micrometer (μm) layer of $Li_{7-3x}Al_xLa_3Zr_2O_{12-y}N_y$ (N-LLZO). As shown in FIG. 7C and FIG. 7D, a defect, e.g., a hole or portion where the LLZO is not present and the YSZ is observed, is not detected and the resulting surface is visibly dense.

X-ray Diffraction Analysis

FIG. 8 illustrates the peaks from the X-Ray photoelectron spectroscopy and the in-situ Raman analysis of $Li_{6.25}Al_{0.25}La_3Zr_2O_{12}$ in Example 2, which has been annealed at a temperature of 700° C. Example 2 was analyzed using powder X-ray diffraction (XRD) using Cu Kα radiation. The presence of these peaks confirms that cubic $Li_{6.25}Al_{0.25}La_3Zr_2O_{12}$ is present in the annealed sample.

Various embodiments are shown in the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Substituted" means that the compound is substituted with at least one (e.g., 1, 2, 3, or 4) substituent, and the substituents are independently a hydroxyl (—OH), a C1-9 alkoxy, a C1-9 haloalkoxy, an oxo (=O), a nitro (—NO$_2$), a cyano (—CN), an amino (—NH$_2$), an azido (—N$_3$), an amidino (—C(=NH)NH$_2$), a hydrazino (—NHNH$_2$), a hydrazono (=N—NH$_2$), a carbonyl (—C(=O)—), a carbamoyl group (—C(O)NH$_2$), a sulfonyl (—S(=O)$_2$-), a thiol (—SH), a thiocyano (—SCN), a tosyl (CH$_3$C$_6$H$_4$SO$_2$—), a carboxylic acid (—C(=O)OH), a carboxylic C1 to C6 alkyl ester (—C(=O)OR wherein R is a C1 to C6 alkyl group), a C1 to C12 alkyl, a C3 to C12 cycloalkyl, a C2 to C12 alkenyl, a C5 to C12 cycloalkenyl, a C2 to C12 alkynyl, a C6 to C12 aryl, a C7 to C13 arylalkylene, a C4 to C12 heterocycloalkyl, or a C3 to C12 heteroaryl instead of hydrogen, provided that the substituted atom's normal valence is not exceeded. The indicated number of carbon atoms for any group herein is exclusive of any substituents.

It is understood that the positive electrode could alternatively be referred to as a cathode, and the negative electrode as an anode. Because the disclosed cells can be recharged, the terms positive and negative have been used for clarity.

While a particular embodiment has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A component for a lithium battery comprising:
a first layer comprising a lithium garnet having a porosity of 0 percent to less than 25 percent, based on a total volume of the first layer; and
a second layer on the first layer and having a porosity of 25 percent to 80 percent, based on a total volume of the second layer,
wherein the second layer comprises yttrium stabilized zirconium; and
wherein an average pore diameter in the second layer is 1 nanometer to 50 nanometers.

2. The component of claim 1, wherein at least one of the following conditions apply: the first layer has a thickness of 0.1 micrometer to 40 micrometers, or the second layer has a thickness of 10 micrometers to 150 micrometers.

3. The component of claim 1, wherein the lithium garnet comprises at least one of a compound of Formula 1 or a compound of Formula 2:

   Formula 1

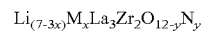   Formula 2 wherein, in Formulas 1 and 2,
each M is independently at least one of H, Hf, W, Te, Al, Ta, Ba, Ga, Sr, Mg, Nb, Fe, Mo, Cs, Ca, or Nd, and
x in Formula 1 and x in Formula 2 are each independently 0≤x<7/3, and 0<y≤6.

4. The component of claim 1 further comprising an ionic liquid in a pore of the second layer.

5. The component of claim 4, wherein the ionic liquid is contained in the component in an amount greater than 0 weight percent up to 30 weight percent, based on a total weight of the first layer and the second layer.

6. The component of claim 4, wherein the ionic liquid is contained in the second layer in an amount of 50 percent to 100 percent of a total pore volume of the second layer.

7. The component of claim 4, wherein the ionic liquid comprises at least one of triethyl ammonium, ethyl methyl imidazolium, butyl methyl imidazolium, 1-methyl-1-propylpyrrolidium, methyl propylpiperidium, bis(trifluoromethylsulfonyl)imide, bis(pentafluoroethylsufonyl)imide, tetrafluoroborate, hexafluorophosphate, poly(1-vinyl-3-alkylimidazolium), a cation of poly(1-allyl-3-alkylimidazolium), or a cation of poly(1-(meth)acryloyloxy-3-alkylimidazolium).

8. A lithium battery comprising:
a positive electrode;
a negative electrode comprising at least one of lithium or a lithium alloy; and
the component of claim 1 between the positive electrode and the negative electrode,
wherein the first layer of the component is proximate to the negative electrode and the second layer is proximate to the positive electrode, and
wherein the second layer of the component comprises an ionic liquid within a pore thereof.

9. A lithium battery comprising:
a positive electrode;
a negative electrode comprising at least one of lithium or a lithium alloy; and
the component of claim 1 between the positive electrode and the negative electrode,
wherein the first layer of the component is proximate to the positive electrode and the second layer is proximate to the negative electrode, and
wherein the second layer of the component comprises an ionic liquid within a pore thereof.

* * * * *